United States Patent
Fujii et al.

(10) Patent No.: US 11,173,570 B2
(45) Date of Patent: Nov. 16, 2021

(54) METAL-JOINING STRUCTURE AND METHOD FOR MANUFACTURING METAL-JOINING STRUCTURE

(71) Applicant: Mitsubishi Electric Corporation, Tokyo (JP)

(72) Inventors: Takafumi Fujii, Tokyo (JP); Yoshikazu Nakano, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/257,863

(22) PCT Filed: Jul. 24, 2018

(86) PCT No.: PCT/JP2018/027598
§ 371 (c)(1),
(2) Date: Jan. 5, 2021

(87) PCT Pub. No.: WO2020/021612
PCT Pub. Date: Jan. 30, 2020

(65) Prior Publication Data
US 2021/0245301 A1 Aug. 12, 2021

(51) Int. Cl.
*B23K 26/21* (2014.01)
*B23K 26/211* (2014.01)
(Continued)

(52) U.S. Cl.
CPC .......... *B23K 26/211* (2015.10); *B23K 26/24* (2013.01); *B23K 26/323* (2015.10); *B23K 2103/20* (2018.08)

(58) Field of Classification Search
CPC .......... B23K 9/235; B23K 9/30; B23K 11/20; B23K 26/211; B23K 26/323; B23K 26/24;
(Continued)

(56) References Cited

U.S. PATENT DOCUMENTS

2007/0006461 A1* 1/2007 McCrink ................. C22C 38/40
29/894.3
2008/0102308 A1* 5/2008 Doira .................... B23K 11/185
428/653
(Continued)

FOREIGN PATENT DOCUMENTS

JP 61-99585 A 5/1986
JP 10-262363 A 9/1998
(Continued)

OTHER PUBLICATIONS

International Search Report and Written Opinion dated Oct. 9, 2018, received for PCT Application No. PCT/JP2018/027598, Filed on Jul. 24, 2018, 8 pages including English Translation.

*Primary Examiner* — Brian W Jennison
(74) *Attorney, Agent, or Firm* — Xsensus LLP

(57) ABSTRACT

A metal-joining structure (100) includes: an iron alloy part (1); an aluminum alloy part (2); and a joining interface layer (3) provided between the iron alloy part (1) and the aluminum alloy part (2). The joining interface layer (3) includes: an iron-silicon solid-solution-phase sublayer (4) in contact with the iron alloy part (1); an aluminum-silicon eutectic-phase sublayer (5) in contact with the aluminum alloy part (2); and a silicon sublayer (6) provided between the iron-silicon solid-solution-phase sublayer (4) and the aluminum-silicon eutectic-phase sublayer (5).

6 Claims, 4 Drawing Sheets

(51) Int. Cl.
*B23K 26/323* (2014.01)
*B23K 26/24* (2014.01)
*B23K 103/20* (2006.01)

(58) Field of Classification Search
CPC .............. B23K 35/302; B23K 2103/20; B23K 11/115; B23K 11/34
See application file for complete search history.

(56) References Cited

U.S. PATENT DOCUMENTS

| | | | |
|---|---|---|---|
| 2010/0288461 A1* | 11/2010 | Valtierra-Gallardo | ........................ C22C 21/04 164/122 |
| 2014/0144889 A1* | 5/2014 | Sakurai | ................. B23K 11/115 219/91.2 |
| 2015/0352659 A1* | 12/2015 | Sigler | .................... B23K 11/36 219/91.2 |
| 2017/0291246 A1* | 10/2017 | Sigler | .................... B23K 11/20 |
| 2017/0297137 A1* | 10/2017 | Perry | .................... B23K 35/302 |
| 2018/0036840 A1 | 2/2018 | Hu et al. | |

FOREIGN PATENT DOCUMENTS

| | | |
|---|---|---|
| JP | 2006-105087 A | 4/2006 |
| JP | 2008-105087 A | 5/2008 |
| JP | 2008-260967 A | 10/2008 |
| JP | 2010-42422 A | 2/2010 |
| JP | 2010-99739 A | 5/2010 |
| JP | 2013-91089 A | 5/2013 |
| JP | 2014-180685 A | 9/2014 |

* cited by examiner

METAL-JOINING STRUCTURE AND METHOD FOR MANUFACTURING METAL-JOINING STRUCTURE

CROSS-REFERENCE TO RELATED APPLICATION

The present application is based on PCT filing PCT/JP2018/027598, filed Jul. 24, 2018, the entire contents of which are incorporated herein by reference.

TECHNICAL FIELD

The present disclosure relates to a metal-joining structure made by welding alloy parts having different melting points and a method for manufacturing the metal-joining structure.

BACKGROUND ART

For parts used for the body of an automobile etc., a joining-structure made by joining alloy parts having different melting points is used.

For example, an aluminum alloy part having a low specific gravity is used for reducing weight; and an iron alloy part is used for realizing high rigidity.

Accordingly, a portion at which an iron alloy part and an aluminum alloy part are combined by welding is produced.

However, because the melting point and the specific gravity of iron alloy are quite different from those of aluminum alloy, it is in general difficult to weld them together. Therefore, a special welding method is required for welding an iron alloy part to an aluminum alloy part.

Patent Document 1 discloses a method for manufacturing a different-material welded structure, in which an aluminum material or an aluminum alloy material is joined with a steel being a type of iron alloy. A different-material welded structure disclosed in Patent document 1 is produced using filler material for joining different materials, the filler material containing silicon and titanium, the rest of the filler material being made of aluminum and aluminum alloy, which is unavoidable impurity.

PRIOR ART DOCUMENTS

Patent Documents

Patent Document 1; Unexamined Patent Application Publication JP, 2014-180685, A

The different-material welded structure described in Patent Document 1 is formed by welding a steel being a type of iron alloy to an aluminum alloy with a joining-different-materials filler material containing aluminum and aluminum alloy, the filler material being interposed between the steel and the aluminum alloy; aluminum components contained in the joining-different-materials filler material react with the iron alloy to form a joining interface layer. This leads to an anxiety that a brittle iron-aluminum intermetallic compound is formed at the joining interface layer to thereby reduce the joint efficiency. Accordingly, in a case in which a different-material welded structure is applied to automobile frame products, there is a problem that the different-material welded structure easily produces cracks.

The present disclosure is made to solve the above-described problem and to provide a metal-joining structure with an improved joining strength of a part made by welding an iron alloy to an aluminum alloy and a method for manufacturing such a metal-joining structure therein.

Solution to Problems

To solve the above-described problems and achieve the objective, a metal-joining structure according to present disclosure includes: an iron alloy part; an aluminum alloy part; and a joining interface layer which is provided between the iron alloy part and the aluminum alloy part and includes an iron-silicon solid-solution-phase sublayer in contact with the iron alloy part, an aluminum-silicon eutectic-phase sublayer in contact with the aluminum alloy part, and a silicon sublayer provided between the iron-silicon solid-solution-phase sublayer and the aluminum-silicon eutectic-phase sublayer.

The metal-joining structure according to present disclosure includes, between the iron alloy part and the aluminum alloy part, a joining interface layer including a silicon sublayer only composed of silicon having a melting point which is lower than that of the iron alloy and a higher than that of the aluminum alloy; therefore, the structure can restrain each of the iron alloy and the aluminum alloy from melting to thereby improve the joining strength.

EMBODIMENTS

Figure 1:
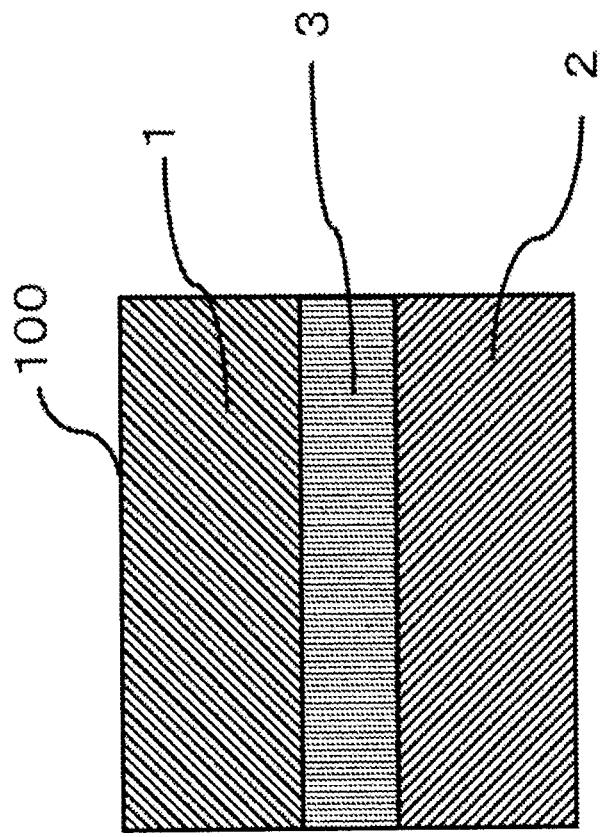
FIG. 1 is a cross section of a metal-joining structure according to Embodiment 1.

Metal-joining structures according to embodiments of the present invention will be described below in detail referring to the drawings. Note that the embodiments do not limit this invention.

Embodiment 1

FIG. 1 is a cross-sectional view of a metal-joining structure according to the present embodiment. The metal-joining structure 100 includes an iron alloy part 1, an aluminum alloy part 2, and a joining interface layer 3 provided between the iron alloy part and the aluminum alloy part.

The type of the iron alloy constituting the iron alloy part 1 and the type of the aluminum alloy constituting the aluminum alloy part 2 are not particularly limited; for the iron alloy part 1, for example, a low-carbon cold-rolled steel sheet (SPCC), a high tensile steel sheet, or a stainless steel sheet can be used; for the aluminum alloy part 2, for example, Japanese Industrial Standards (JIS)-A1000 series (pure aluminum series), JIS-A2000 series (aluminum-copper alloy series), JIS-A3000 series (aluminum-manganese alloy series), JIS-A4000 series (aluminum-silicon alloy series), JIS-A5000 series (aluminum-magnesium alloy series), JIS-A6000 series (aluminum-magnesium-silicon alloy series), or JIS-A7000 series (aluminum-zinc-magnesium alloy series) can be used.

Figure 2:
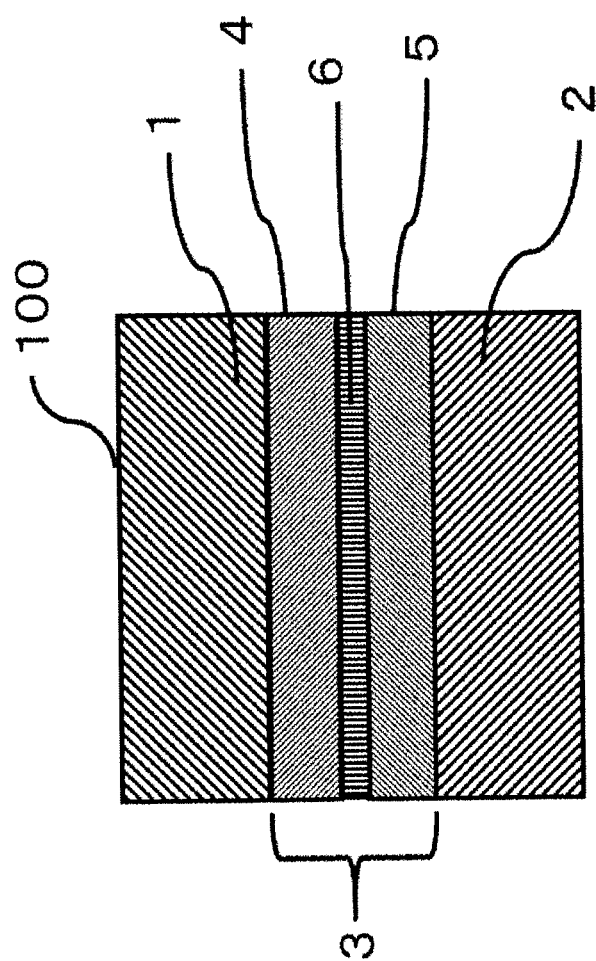
FIG. 2 is a view showing a specific example of a joining interface layer of the metal-joining structure shown in FIG. 1.

FIG. 2 is a view showing a specific example of the joining interface layer shown in FIG. 1. Using FIG. 2, the structure of the joining interface layer 3 of the metal-joining structure 100 according to the present embodiment will be described. The joining interface layer 3 includes an iron-silicon solid-solution-phase sublayer 4, an aluminum-silicon eutectic-phase sublayer 5, and a silicon sublayer 6 which is formed between the iron-silicon solid-solution-phase sublayer 4 and the aluminum-silicon eutectic-phase sublayer 5. By incompletely melting the silicon layer 7, the silicon sublayer 6 is formed as an unmelted silicon layer that is not fused with other metals. Note that silicon has a melting point lower than iron and higher than aluminum.

Here, the solid solution phase is a phase where some of atoms in the crystal are replaced by atoms of another element while the original crystal structure remains unchanged, or some atoms of another element are incorporated thereinto; the eutectic phase is a phase where a crystal including two or more elements is uniformly mixed with a crystal having a component ratio different from that of the former crystal.

The iron-silicon solid solution phase sublayer 4 is in a phase where silicon particles are incorporated into an iron matrix, making the matrix hard to thereby improve joining strength. The aluminum-silicon eutectic phase sublayer 5 is in a phase where silicon particles are dispersed in an aluminum matrix, making the matrix hard to thereby improve joining strength. When a solid solution becomes hard in the case of a solid solution including different elements, the lattice constant changes but the crystal structure remains unchanged from that of the matrix. On the other hand, the iron-aluminum intermetallic compound formed by crystallization has a crystal structure different from that of the matrix and has poor matching with the matrix, and the crystals thereof are coarse and difficult to be dispersed. Therefore, it tends to be a start point of a crack in the metal-joining structure. That is, there is a possibility to reduce the joining strength. Therefore, in the metal-joining structure 100, there exist an iron-silicon solid-solution-phase sublayer 4, an aluminum-silicon eutectic-phase sublayer 5, and a silicon sublayer 6 between the iron alloy part 1 and the aluminum alloy part 2, whereby the joining strength between the iron alloy part 1 and the aluminum alloy part 2 is significantly improved. Since the boundaries of silicon grains in the aluminum-silicon eutectic-phase sublayer 5 have poor matching with the iron matrix and the aluminum matrix, it is desirable that the sizes of the silicon grains are small in order to improve the joining strength.

The structure of the joining interface layer 3 in the present embodiment is described above by taking, as an example, a combination of the iron-silicon solid-solution-phase sublayer, the silicon sublayer, and the aluminum-silicon eutectic-phase sublayer. However, it is needless to say that a combination of an iron-silicon solid-solution-phase sublayer, a silicon sublayer, and an aluminum-silicon solid solution sublayer, or a combination of an iron-silicon eutectic sublayer, a silicon sublayer, and an aluminum-silicon eutectic-phase sublayer also achieves the same advantage.

Next, a manufacturing method of the metal-joining structure 100 will be described using FIG. 3 and FIG. 4. FIG. 4 shows a portion where an iron alloy part 1 is plied onto an aluminum alloy part 2 on which a silicon layer 7 to be described later is formed. The iron alloy part 1 (the melting point of iron: 1538 degrees C.), the aluminum alloy part 2 (the melting point of aluminum: 660 degrees C.), and a silicon layer 7 (the melting point of silicon: 1414 degrees C.) are used for manufacturing of the metal-joining structure 100; for implementation examples and comparison examples, a cold rolled steel plate (SPCC) is used for the iron alloy that constitutes the iron alloy part 1 and A6063 is used for the aluminum alloy that constitutes the aluminum alloy part 2. A YAG laser is used as the light source of a high energy beam 8.

First, a silicon coating is formed on a joining surface of the aluminum alloy part 2 by a cold spray method to form a silicon layer 7. It is preferable that the silicon constituting the silicon layer 7 has a high purity, hopefully 95 wt % to 99.99 wt %. In the present embodiment, the silicon layer 7 is formed on the joining surface of the aluminum alloy part 2 so as to have a thickness of 1.0 μm by the cold spray method using 99.99 wt % silicon powder.

The cold spray method is a technique to form a coating by colliding a powder material in a solid state below its melting temperature with a base material, without melting the powder material or without gasifying the material. By using the cold spray method, the silicon layer 7 can be uniformly formed without melting the aluminum alloy part 2 having a lower melting point than that of the silicon layer 7.

The aluminum alloy part 2 has a strong oxide film ($Al_2O_3$ film) on its surface; this oxide film prevents the surface from being welded. However, by using the cold spray method, the oxide film is broken by the collision of the powder material grains, whereby a silicon layer 7 can be formed on the surface of the aluminum alloy part 2 with the oxide film being removed.

Figure 3:
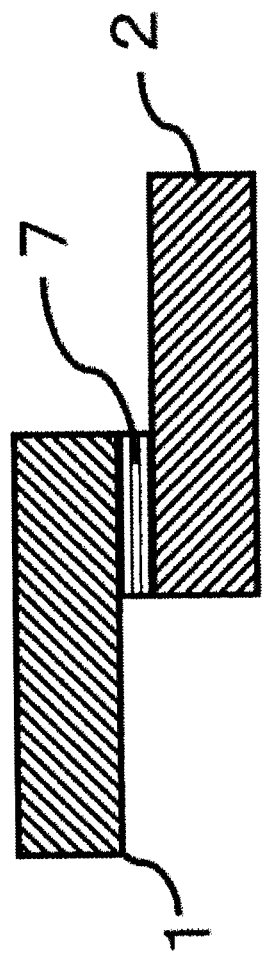
FIG. 3 is a view for explaining the state of the metal-joining structure before manufacturing.
Figure 4:
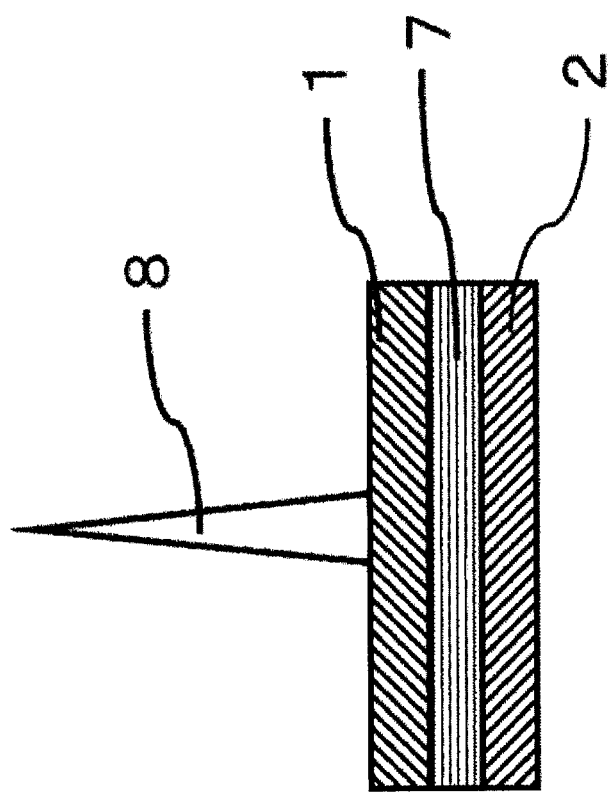
FIG. 4 is a view for explaining a joining method of the metal-joining structure.

Next, under the condition, shown in FIG. 3, that the iron alloy part 1 overlaps with the aluminum alloy part 2 on which the silicon layer 7 has been formed, a high energy beam 8 is radiated from the side of the iron alloy part 1 to the center of the overlapping portion. As radiation conditions for the high energy beam 8, the spot diameter Φ at the irradiation point of the high energy beam 8, the laser power, and radiation time are set so as to produce a temperature distribution which does not causes the aluminum alloy part 2 to be melted, but causes only the silicon layer 7 to be melted.

Specifically, an iron alloy part 1 which has an area of 80 mm×20 mm and a thickness of 0.5 mm and an aluminum alloy part 2 on which a silicon layer 7 is formed and which has an area of 80 mm×20 mm and a thickness of 1.0 mm are used; and the alloy parts are overlapped so as to have a 20 mm-wide overlap. By using an oscillator producing a high energy beam 8 with a maximum output of 3 kW and a lens having a focal length of 100 mm, the high energy beam 8 is defocused to have a spot diameter Φ of 6 mm at the beam's target point on the iron alloy part 1, and the iron alloy part is irradiated for 2 seconds at a laser output of 1 kW. During the radiation of the high energy beam 8, argon gas is blown at a flow rate of 20 L/min from a nozzle (not shown in the figure) disposed coaxially with the laser beam axis, to shield the alloy parts.

Next, how the state of the joining interface changes during the joining process will be described. As shown in FIG. 3, when the high energy beam 8 is radiated from the side of the iron alloy part 1, the heat conducted from the iron alloy part 1 melts silicon and aluminum, forming an aluminum-silicon eutectic-phase sublayer 5. Via the aluminum-silicon eutectic-phase sublayer 5, a silicon sublayer 6 made by partially melting the silicon layer 7 itself is firmly joined with the aluminum alloy part 2. Also, the iron alloy part 1 having a higher melting point than the silicon layer 7 melts only in very shallow part of its surface joining with the silicon layer 7, to thereby form an iron-silicon solid-solution-phase sublayer 4. Via the iron-silicon solid-solution-phase sublayer 4, the silicon sublayer 6 formed by melting the silicon layer 7 itself is joined firmly with the iron alloy part 1. In this process, the iron-silicon solid-solution-phase sublayer 4 and the aluminum-silicon eutectic-phase sublayer 5 are sequentially formed by mutual-diffusion between iron and silicon and interdiffusion between aluminum and silicon, respectively. Therefore, each of these sublayers becomes thicker compared with the silicon layer 7, whereby the thickness of the joining interface layer 3 increases.

The radiation of the high energy beam 8 should preferably be adjusted so that the heating is performed at a temperature equal to or higher than the melting point of the silicon layer 7 and at a temperature equal to or lower than the melting point of the iron alloy part 1. Note that, if the high energy beam 8 is radiated from the side of the bottom of the aluminum alloy part 2, the aluminum alloy part 2 completely melts first without melting the iron alloy part 1, so that these two parts cannot be joined.

As described so far, by irradiating the upper face of the iron alloy part 1 with the high energy beam 8, the metal-joining structure 100 as shown in FIG. 1 can be obtained. The present embodiment has been described, taking the YAG laser as an example of the light source of the high energy beam 8. However, the light source that can be used here is not limited to the YAG laser, and a $CO_2$ laser, a fiber laser, a disk laser, a semiconductor laser, or the like may be used.

Since the joining method of the present embodiment does not require plating, it can be easily applied to materials which are difficult to plate. As a result, the plating process can be eliminated.

In the following description, the joint efficiencies of metal-joining structures 100 obtained by the above-mentioned joining method and those of comparison examples are evaluated. A joint efficiency is a value that indicates how strong a welded joint is in relation to the strength of its base metal.

Evaluation Method

Regarding the thicknesses of the joining interface layers 3, samples are mirror-finished by mechanical polishing, to prepare observation samples for the cross sections of the joining surfaces; and then, measurements are conducted using a scanning electron microscope (SEM).

Regarding the presence or absence of each of the iron-silicon solid-solution-phase sublayer 4, the aluminum-silicon eutectic-phase sublayer 5, and the silicon sublayer 6, crystal structure analyses based on X-ray diffraction (XRD) are performed on the joining surfaces' cross sections of the observation samples; the ratios of peak intensities that originate from the iron-silicon solid-solution-phase sublayer 4, the aluminum-silicon eutectic-phase sublayer 5, and the silicon sublayer 6 are used for determining their respective presence or absence.

The joint efficiencies are calculated from the tensile shear strengths measured by conducting tensile tests on the metal-joining structures. Evaluations of the joint efficiencies are classified: a sample having a joint efficiency 80% or higher is labeled as "Good"; a sample having a joint efficiency 60% or higher and lower than 80% are labeled as "Fair"; and a sample having a joint efficiency lower than 60% is labeled as "Bad". Table 1 summarizes evaluation results of implementation examples and comparison examples.

TABLE 1

| | Aluminum alloy | Iron alloy | Thickness of silicon layer (μm) | Thickness of joining interface layer (μm) | Solid solution sublayer | Silicon sublayer | Eutectic sublayer | Joint efficiency |
|---|---|---|---|---|---|---|---|---|
| Comparison example 1 | A6063 | SPCC | 0.2 | absent | absent | absent | absent | Bad |
| Example 1 | A6063 | SPCC | 1.0 | 1.19 | present | present | present | Good |
| Example 2 | A6063 | SPCC | 100 | 121 | present | present | present | Good |
| Example 3 | A6064 | SPCC | 300 | 363 | present | present | present | Fair |
| Comparison example 2 | A6063 | SPCC | 700 | 874 (No joining interface layer formed) | absent | absent | absent | Bad |

From Table 1, in order to form a sublayer only composed of silicon by melting the silicon layer 7, the silicon layer 7 should preferably have a thickness of 1.0 μm to 300 μm from a viewpoint of joint efficiency. The reason why the silicon layer 7 should preferably have a thickness of 1.0 μm to 300 μm is that a thickness less than 1.0 μm causes iron to diffuse into aluminum, and a thickness more than 300 μm causes a problem of peeling off. That is, in the comparison example 1, the silicon layer 7 is thin, causing the aluminum alloy part 2 to melt during welding. This does not form a solid solution sublayer, a silicon sublayer, and a eutectic sublayer in the joining interface, but forms a coarse iron-aluminum intermetallic compound, thereby deteriorating the joint efficiency. On the other hand, in the comparison example 2, the silicon layer 7 is extremely thick to require a large amount of heat for melting. This causes the silicon layer 7 to be overheated, thereby melting surface layers of the iron alloy part 1 and the aluminum alloy part 2 and then forming a coarse iron-aluminum intermetallic compound, which results in a reduction of the joining strength between the joining interface layer 3 and the iron alloy part 1 and a reduction of the joining strength between the joining interface layer 3 and the aluminum alloy part 2, deteriorating the joint efficiency.

Table 1 shows that the joint efficiency is satisfactory in cases where the thickness of the joining interface layer 3 is in the range of 1.0 µm to 360 µm. This is because it is difficult to stably form, while maintaining uniformity, a joining interface layer 3 with a thickness less than 1.0 µm, and also because it is difficult to form a stable joining interface layer 3 with a thickness more than 360 µm since a silicon layer 7 necessary for forming such a joining interface layer peels off.

By the manufacturing method described so far, the metal-joining structure according to the present embodiment shown in FIG. 1 is obtained. According to the metal-joining structure of the present embodiment, the presence of the silicon sublayer 6 formed by melting the silicon layer 7 itself makes it possible to prevent the iron alloy part 1 from flowing into the side of the aluminum-silicon eutectic-phase sublayer 5 and to prevent the aluminum alloy part 2 from flowing into the side of the iron-silicon solid-solution-phase sublayer 4. Therefore, it is possible to prevent the iron alloy part 1 and the aluminum alloy part 2 from directly melting and thereby prevent a coarse iron-aluminum intermetallic compound from be formed, which brings an advantage to improve the joining strength between different kinds of metal, i.e. the iron alloy part 1 and the aluminum alloy part 2.

By using the metal-joining structure according to the present embodiment, it is possible to apply an aluminum alloy part, which is lighter than an iron alloy part, to some of the parts used for a car body or the like, particularly for its chassis, its trunk, and its frame, which can realize its weight reduction.

DESCRIPTION OF THE SYMBOLS

1: iron alloy part, 2: aluminum alloy part, 3: joining interface layer, 4: iron-silicon solid-solution-phase sublayer, 5: aluminum-silicon eutectic-phase sublayer, 6: silicon sublayer, 7: silicon layer, 8: high energy beam, 100: metal-joining structure

The invention claimed is:
1. A metal-joining structure comprising:
an iron alloy part;
an aluminum alloy part; and
a joining interface layer which is provided between the iron alloy part and the aluminum alloy part and includes
an iron-silicon solid-solution-phase sublayer in contact with the iron alloy part,
an aluminum-silicon eutectic-phase sublayer in contact with the aluminum alloy part, and
a silicon sublayer provided between the iron-silicon solid-solution-phase sublayer and the aluminum-silicon eutectic-phase sublayer.

2. The metal-joining structure according to claim 1, wherein a thickness of the joining interface layer is within a range from 1.0 µm to 360 µm.

3. A manufacturing method of a metal-joining structure comprising:
forming a silicon layer on a joining surface of an aluminum alloy part;
overlapping an iron alloy part and the aluminum alloy part with the silicon layer being interposed therebetween; and
joining the iron alloy part to the aluminum alloy part by heating the iron alloy part with a high energy beam being incident on a side of the iron alloy part and thereby causing heat conduction from the side of the iron alloy,
joining the iron alloy part to the aluminum alloy part by heating the iron alloy part with a high energy beam being incident on a side of the iron alloy part, thereby heat conducted from the side of the iron alloy causing
melting of a joining surface between the iron alloy part and the silicon layer to form an iron-silicon solid-solution-phase sublayer,
melting of a joining surface between the aluminum alloy part and the silicon layer to form an aluminum-silicon eutectic-phase sublayer, and
melting of the silicon layer to form a silicon sublayer.

4. The manufacturing method of a metal-joining structure according to claim 3, wherein a thickness of the silicon layer is within a range from 1.0 µm to 300 µm.

5. The manufacturing method of a metal joining structure according to claim 3, wherein the silicon layer is formed by depositing a coating of silicon on the joining surface of the aluminum alloy part by a cold spray method.

6. The manufacturing method of a metal joining structure according to claim 4, wherein the silicon layer is formed by depositing a coating of silicon on the joining surface of the aluminum alloy part by a cold spray method.

* * * * *